US010300929B2

(12) United States Patent
Nagy et al.

(10) Patent No.: US 10,300,929 B2
(45) Date of Patent: May 28, 2019

(54) ADAPTIVE USER INTERFACE FOR AN AUTONOMOUS VEHICLE

(71) Applicant: Robert Bosch GmbH, Stuttgart (DE)

(72) Inventors: Akos Nagy, Mountain View, CA (US); Jan Becker, Palo Alto, CA (US); Moritz Achim Florian Dechant, Los Altos, CA (US)

(73) Assignee: Robert Bosch GmbH, Stuttgart (DE)

( * ) Notice: Subject to any disclaimer, the term of this patent is extended or adjusted under 35 U.S.C. 154(b) by 125 days.

(21) Appl. No.: 15/540,350

(22) PCT Filed: Dec. 30, 2015

(86) PCT No.: PCT/US2015/068012
§ 371 (c)(1),
(2) Date: Jun. 28, 2017

(87) PCT Pub. No.: WO2016/109635
PCT Pub. Date: Jul. 7, 2016

(65) Prior Publication Data
US 2018/0001903 A1    Jan. 4, 2018

Related U.S. Application Data

(60) Provisional application No. 62/097,868, filed on Dec. 30, 2014.

(51) Int. Cl.
*B60W 50/14* (2012.01)
*B60W 30/09* (2012.01)
(Continued)

(52) U.S. Cl.
CPC ............ *B60W 50/14* (2013.01); *B60K 35/00* (2013.01); *B60K 37/06* (2013.01); *B60W 30/09* (2013.01);
(Continued)

(58) Field of Classification Search
CPC ......... B60W 2540/26; B60W 2540/22; B60W 2040/0872; B60W 2540/24;
(Continued)

(56) References Cited

U.S. PATENT DOCUMENTS 6,812,942 B2   11/2004  Ribak
8,209,093 B2    6/2012  Hill
(Continued)

FOREIGN PATENT DOCUMENTS

CN    101417655 A    4/2009
CN    101443227 A    5/2009
(Continued)

OTHER PUBLICATIONS

International Search Report and Written Opinion for Application No. PCT/US2015/068012 dated Apr. 14, 2016, (11 pages).
(Continued)

*Primary Examiner* — Dale Moyer
(74) *Attorney, Agent, or Firm* — Michael Best & Friedrich LLP

(57) ABSTRACT

Systems and methods are described for an adaptive user interface system for a vehicle with an automatic vehicle system. The adaptive user interface system includes a display and an electronic controller. The controller is configured to generate a graphical user interface indicative of operation of the automatic vehicle system, output the graphical user interface on the display, monitor an indicia of a driver's comfort level, and determine, based on the monitored indicia, when the driver is not comfortable with the operation of the automatic vehicle system. In response to determining that the driver is not comfortable with the operation of the automatic vehicle system, the electronic controller modifies the graphical user interface to provide an increased level of detail.

14 Claims, 6 Drawing Sheets

(51) Int. Cl.
  *B60W 30/14* (2006.01)
  *B60W 50/08* (2012.01)
  *B60K 35/00* (2006.01)
  *B60K 37/06* (2006.01)

(52) U.S. Cl.
  CPC ............ *B60W 30/14* (2013.01); *B60W 50/08* (2013.01); *B60K 2350/1028* (2013.01); *B60K 2350/1032* (2013.01); *B60K 2350/2013* (2013.01); *B60K 2350/96* (2013.01); *B60W 2050/146* (2013.01); *B60W 2540/00* (2013.01); *B60W 2540/22* (2013.01)

(58) Field of Classification Search
  CPC .......... B60W 30/182; B60W 2050/146; G05D 1/0061; B60R 2022/4866; B60K 2350/96; B60K 2350/965; B60K 2350/1028; B60K 2350/1004; B60K 2350/962; B60K 2350/1032; B60K 2350/106; B60K 2350/906; B60K 2350/967
  See application file for complete search history.

(56) References Cited

U.S. PATENT DOCUMENTS

| | | | |
|---|---|---|---|
| 8,676,431 B1* | 3/2014 | Mariet | B60T 7/22 701/28 |
| 8,712,632 B2 | 4/2014 | Tuukkanen | |
| 2006/0218506 A1 | 9/2006 | Srenger et al. | |
| 2009/0040054 A1* | 2/2009 | Wang | B60W 30/095 340/576 |
| 2009/0262239 A1 | 10/2009 | Cho et al. | |
| 2010/0179932 A1 | 7/2010 | Yoon et al. | |
| 2010/0182140 A1 | 7/2010 | Kohno et al. | |
| 2011/0022393 A1 | 1/2011 | Waller et al. | |
| 2011/0082620 A1 | 4/2011 | Small et al. | |
| 2012/0306637 A1 | 12/2012 | McGough et al. | |
| 2013/0144470 A1* | 6/2013 | Ricci | H04W 4/90 701/2 |
| 2014/0088840 A1* | 3/2014 | Baumgarten | B60K 28/06 701/50 |
| 2015/0175169 A1* | 6/2015 | Flehmig | B60T 7/12 701/41 |
| 2017/0021837 A1* | 1/2017 | Ebina | B60K 28/06 |

FOREIGN PATENT DOCUMENTS

| | | |
|---|---|---|
| CN | 102109821 B | 8/2013 |
| DE | 102011101708 A1 | 11/2012 |

OTHER PUBLICATIONS

First Office Action from the National Intellectual Property Office Administration, P.R. China for Application No. 201580077143.5 dated Nov. 27, 2018 (8 pages).

* cited by examiner

ADAPTIVE USER INTERFACE FOR AN AUTONOMOUS VEHICLE

RELATED APPLICATIONS

This application claims the benefit of U.S. Provisional Application No. 62/097,868, filed Dec. 30, 2014, the entire contents of which are incorporated herein by reference.

BACKGROUND

Embodiments of the invention relate to the field of automotive control systems. In particularly, some embodiments of the invention relate to driver assistance systems and driver interface devices.

Driver assistance systems such as, for example, adaptive cruise control and automated lane change systems have been successfully deployed to the market to increase of driver comfort and safety. As these driver assistance systems progress in sophistication, less driver interaction may be required. In some cases, the driver assistance systems may be fully automated for portions of a trip. Accordingly, the role of the driver has changed from that of an active driver to that of a passenger, for at least some portion of the trip. Highly automated vehicles allow the driver to hand over control to the automated vehicle and to do other tasks while driving.

SUMMARY

Vehicle systems that employ an adaptive cruise control or automated driving features may provide a user interface shown on a display that provide the user/driver with information regarding the operations being performed by the automated system. However, some advanced automated vehicle systems may require little or no interaction from the user/driver during normal operation of the automated vehicle system. Instead, one function and purpose of providing a graphical user interface with detailed feedback information for the user/driver is to allow the user/driver to feel more comfortable "letting go" of control over the operation of the vehicle and turning operation of the vehicle over to the automated system.

A novice user/driver may require a substantial amount of information about the system state and the operations being performed by the automated vehicle system in order to develop trust in the automated system and to be convinced that the automated system is functioning safely and properly. On the other hand, a more experienced user/driver may have already developed a significant degree of trust and may prefer a simpler user interface with less information.

Some embodiments of this invention provide an adaptive user interface for a vehicle equipped with one or more automated vehicle systems. The adaptive user interface changes the format and level of detail of the information displayed on the user interface based on feedback from the user/driver. In some embodiments, the adaptive system is configured to be manually adjusted by the user/driver. In other embodiments, the adaptive system is configured to monitor one or more sensors and to ascertain a stress level of the driver to evaluate whether the driver is comfortable with the level of information being displayed on the user interface.

In one embodiment, the invention provides an adaptive user interface system for a vehicle with an automatic vehicle system. The adaptive user interface system includes a display and an electronic controller. The controller is configured to generate a graphical user interface indicative of operation of the automatic vehicle system, output the graphical user interface on the display, monitor an indicia of a driver's comfort level, and determine, based on the monitored indicia, when the driver is not comfortable with the operation of the automatic vehicle system. In response to determining that the driver is not comfortable with the operation of the automatic vehicle system, the electronic controller modifies the graphical user interface to provide an increased level of detail.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be utilized to implement the invention. It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

Figure 1:
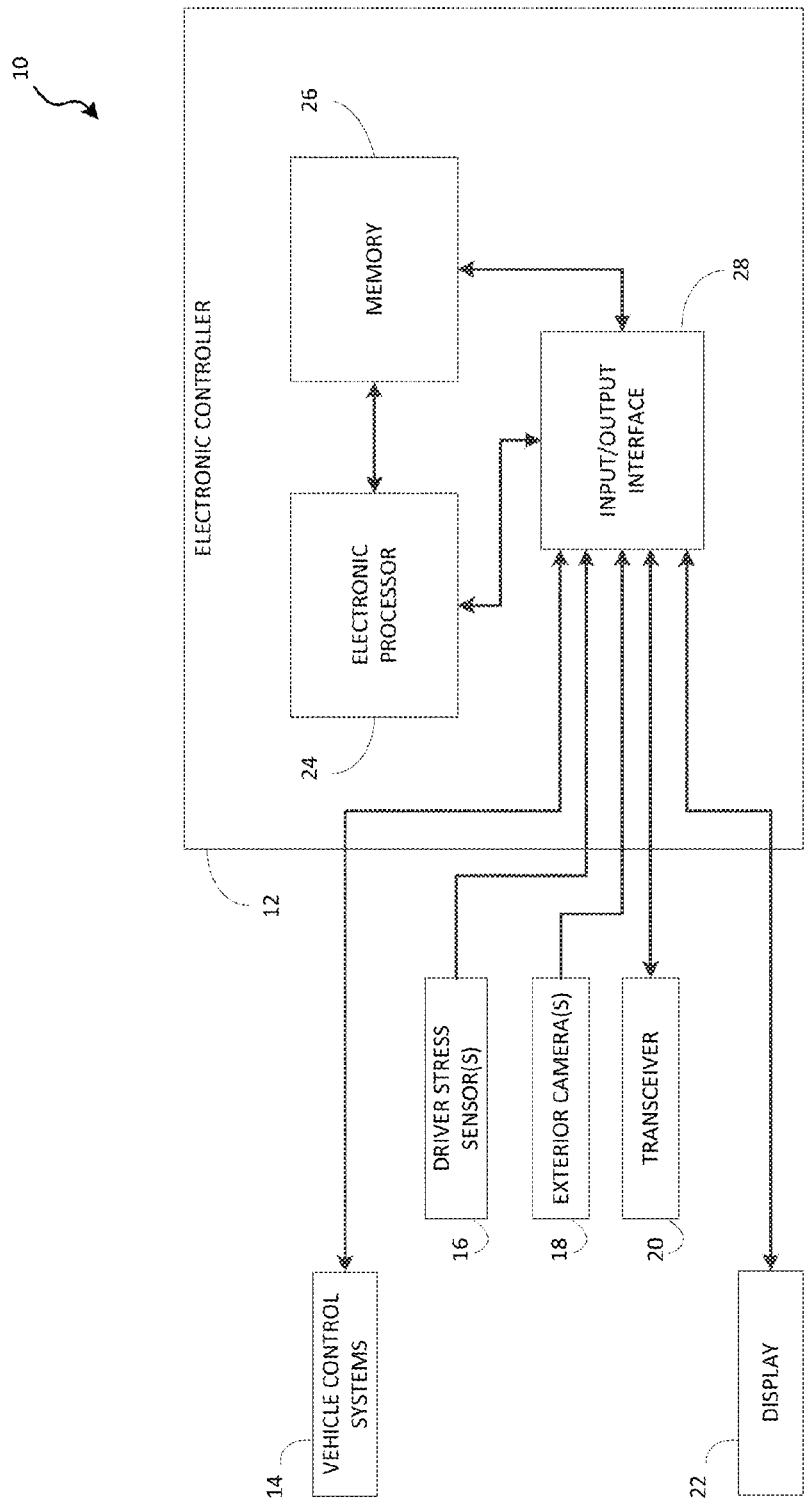
FIG. 1 is a block diagram of an autonomous vehicle control system in accordance with some embodiments.

FIG. 1 is a block diagram of one exemplary embodiment of an autonomous vehicle control system 10. As described more particularly below, the autonomous vehicle control system 10 may be mounted on, or integrated into, a vehicle (not shown) and autonomously drives the vehicle. It should be noted that, in the description that follows, the terms "autonomous vehicle" and "automated vehicle" should not be considered limiting. The terms are used in a general way to refer to an autonomous or automated driving vehicle, which possesses varying degrees of automation (i.e., the vehicle is configured to drive itself with limited, or in some cases no, input from a driver). The systems and methods described herein may be used with any vehicle capable of operating partially or fully autonomously, being controlled manually by a driver, or some combination of both.

In the example illustrated, the autonomous vehicle control system 10 includes an electronic controller 12, vehicle control systems 14, sensors 16, one or more exterior vehicle cameras 18, a transceiver 20, and a display 22. The components of the autonomous vehicle control system 10, along with other various modules and components are electrically coupled to each other by or through one or more control or data buses, which enable communication therebetween. The use of control and data buses for the interconnection between, and communication among, the various modules and components would be known to a person skilled in the art in view of the invention described herein. In alternative embodiments, some or all of the components of the autonomous vehicle control system 10 may be communicatively coupled using suitable wireless modalities (for example, Bluetooth™ or near field communication). For ease of description, the autonomous vehicle control system 10 illustrated in FIG. 1 includes one of each of the foregoing components. Alternative embodiments may include one or more of each component, or may exclude or combine some components. The electronic controller 12 controls the vehicle control systems 14, sensors 16, exterior camera(s) 18, transceiver 20, display 22, to autonomously control the vehicle according to the methods described herein. In some embodiments, the electronic controller 12 controls the vehicle control systems 14, sensors 16, exterior cameras 18, transceiver 20, display 22 by transmitting control signals or instructions to these devices and systems.

The electronic controller 12 includes an electronic processor 24 (e.g., a microprocessor, application specific integrated circuit, etc.), a memory 26, and an input/output interface 28. The memory 26 may be made up of one or more non-transitory computer-readable media, and includes at least a program storage area and a data storage area. The program storage area and the data storage area can include combinations of different types of memory, such as read-only memory ("ROM"), random access memory ("RAM") (e.g., dynamic RAM ("DRAM"), synchronous DRAM ("SDRAM"), etc.), electrically erasable programmable read-only memory ("EEPROM"), flash memory, a hard disk, an SD card, or other suitable magnetic, optical, physical, or electronic memory devices. The electronic processor 24 is coupled to the memory 26 and the input/output interface 28. The electronic processor 24 sends and receives information (e.g., from the memory 26 and/or the input/output interface 28), and processes the information by executing one or more software instructions or modules, capable of being stored in the memory 26, or another non-transitory computer readable medium. The software can include firmware, one or more applications, program data, filters, rules, one or more program modules, and other executable instructions. The electronic processor 24 is configured to retrieve from the memory 26 and execute, among other things, software for autonomous vehicle control, and for performing methods as described herein.

The input/output interface 28 transmits and receives information from devices external to the electronic controller 12 (e.g., over one or more wired and/or wireless connections), such as the vehicle control systems 14, the sensors 16, the exterior cameras 18, the transceiver 20, and the display 22. The input/output interface 28 receives user input, provides system output, or a combination of both. As described herein, user input from a driver or passenger of a vehicle may be provided by one or more human-machine interface components including, for example, a touch-screen display 22, a microphone, or a button/control. The input/output interface 38 may also include other input and output mechanisms, which for brevity are not described herein and which may be implemented in hardware, software, or a combination of both.

It should be understood that although FIG. 1 illustrates only a single electronic processor 24, memory 26, and input/output interface 28, alternative embodiments of the electronic controller 12 may include multiple processing units, memory modules, and/or input/output interfaces. It should also be noted that the autonomous vehicle control system 10 may include other electronic controllers, each including similar components as, and configured similarly to, the electronic controller 12. In some embodiments, the electronic controller 12 is implemented partially or entirely on a semiconductor (e.g., a field-programmable gate array ["FPGA"] semiconductor) chip. Similarly, the various modules and controllers described herein may be implemented as individual controllers, as illustrated, or as components of a single controller. In some embodiments, a combination of approaches may be used.

The electronic processor 24 uses the input/output interface 28 to send and receive information or commands to and from the vehicle control systems 14 (e.g., over a vehicle communication bus, such as a CAN bus). The vehicle control systems 14 include components (e.g., actuators, motors, and controllers) to control a plurality of vehicle systems (e.g., braking, steering, and engine power output). For the sake of brevity, the vehicle control systems 14 will not be described in greater detail. The electronic processor 24 is configured to operate the vehicle control systems 14 to autonomously drive the vehicle. In some embodiments, the vehicle control systems 14 are controlled to automatically drive the vehicle without driver intervention or input for the entirety of a trip. In other embodiments, the vehicle control systems 14 are controlled to drive the vehicle for one or more portions of a trip, and to allow or require a driver to manually operate the vehicle for one or more portions of the trip.

FIGS. 2-5 illustrate various examples of user interfaces that may be selectively output to the display 28. Each user interface includes a different level of information and may be selectively displayed based on the preference of the driver or automatically based on indicators detected by the sensors 16 that may be indicative of driver stress or discomfort.

Figure 2:
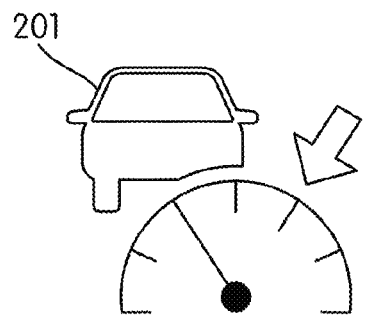
FIG. 2 is a user interface displayed by the autonomous vehicle control system of FIG. 1 according to a first level of detail including a static icon.

For example, the user interface of FIG. 2 illustrates a static icon 201 that indicates whether the automatic vehicle system is active or inactive. The user interface of FIG. 2 provides very little dynamic information and would often not be preferred by a novice driver that is not familiar or comfortable with an automated vehicle system. However, a driver that is more experienced and familiar with automated vehicle systems may prefer the simplicity of the user interface of FIG. 2.

Figure 3:
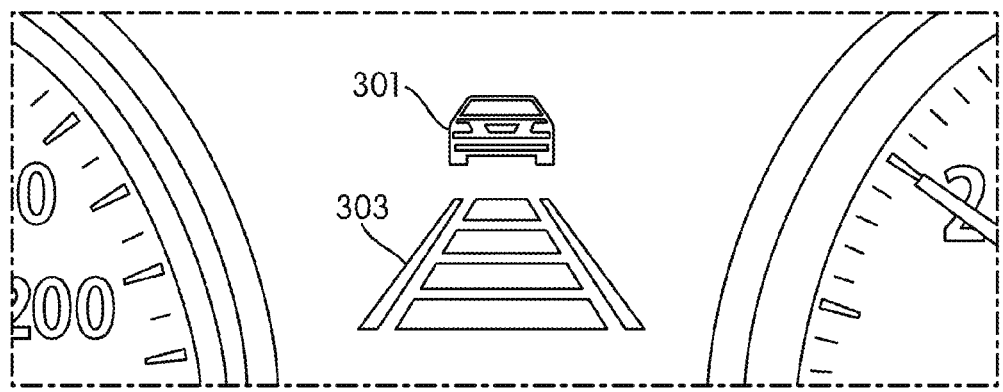
FIG. 3 is a user interface displayed by the autonomous vehicle control system of FIG. 1 according to a second level of detail including a static icon and a dynamic indicator.

FIG. 3 illustrates another example of a user interface that can be selectively output on the display 28. This user interface includes a static icon 301 indicating whether the automated vehicle system is active or inactive and also includes a dynamic indicator 303. In this example, the dynamic indicator 303 includes a segmented bar graph indicating a calculated time gap set to the preceding vehicle by a driver. Like the example of FIG. 2, the user interface in FIG. 3 shows only activation/deactivation of the system and further includes a setting made by the driver, but it does not the displayed information based on the actual detected driving conditions.

Figure 4:
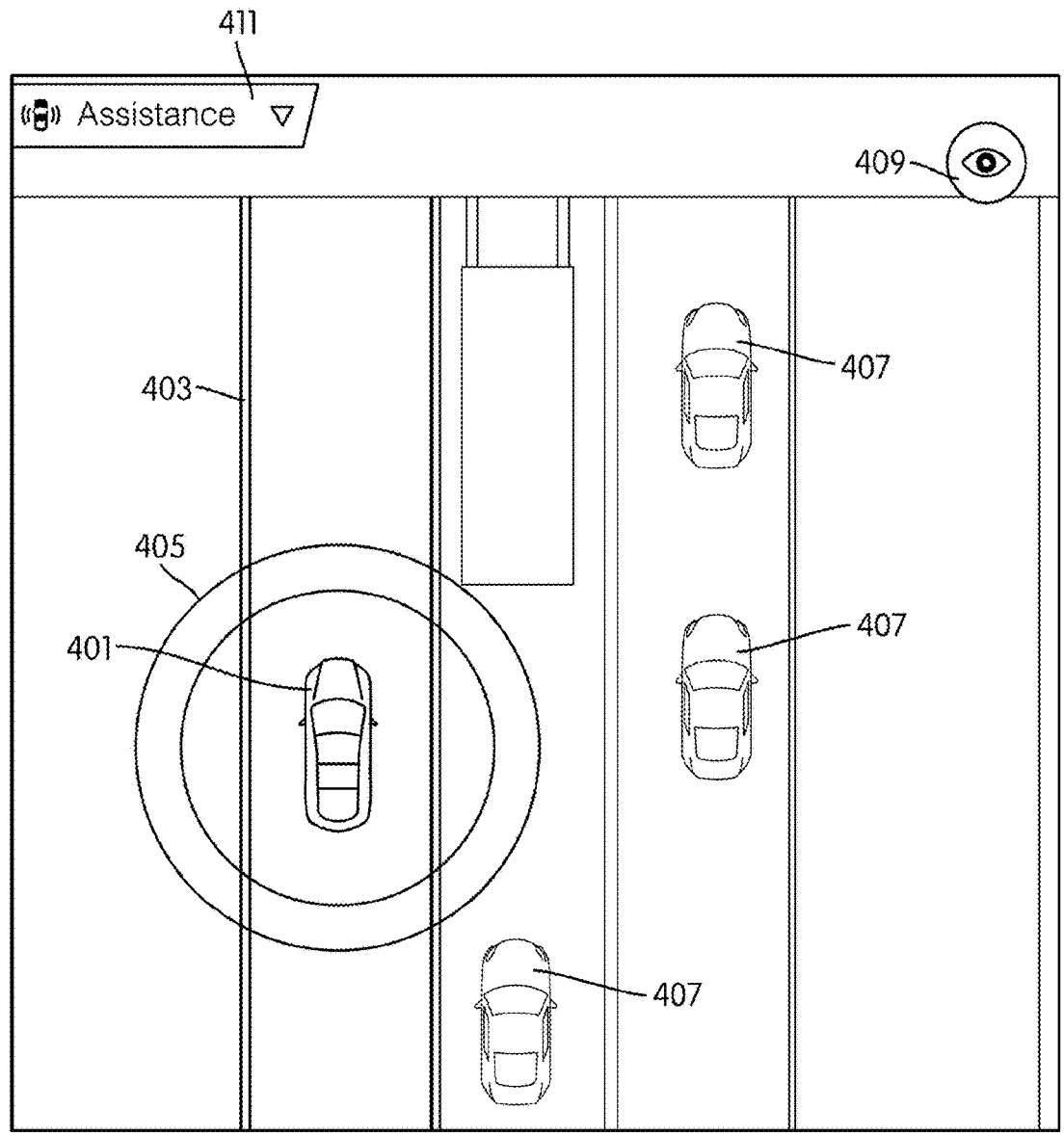
FIG. 4 is a user interface displayed by the autonomous vehicle control system of FIG. 1 according to a third level of detail including a dynamic two-dimensional view of detected vehicle and traffic data.

FIG. 4 illustrates yet another example of a more detailed and dynamic user interface that may be shown on the display 28. Instead of merely providing static indicators, The user interface of FIG. 4 provides dynamic details indicating the surrounding environment. The user interface of FIG. 4 provides a simulated overhead view of the vehicle 401 and the driving lane 403 currently occupied by the vehicle 401. In various constructions and implementations, the location and shape of the driver lane may be determined based, for example, on image data captured by the exterior camera(s) 18 and/or on predetermined map information as indicated by a global positioning/satellite navigation system.

In addition to displaying the vehicle 401 and the driving lane 403, the user interface of FIG. 4 illustrates a circular indicator 405 around the displayed vehicle 401. The size of the circular indicator 405 may be defined based on the user's preset driving preferences and, in some constructions, may change color when another vehicle or an obstacle approaches within a certain defined distance of the vehicle 401. The user interface of FIG. 4 also displays graphical representations of other vehicles 407 detected by the automatic vehicle system. This user interface includes a symbolic indicator 409 that displays various information and warnings and also includes a drop-down menu 411 that can be used by the driver to manually adjust preferences and settings for the vehicle (including user interface display settings).

Figure 5:
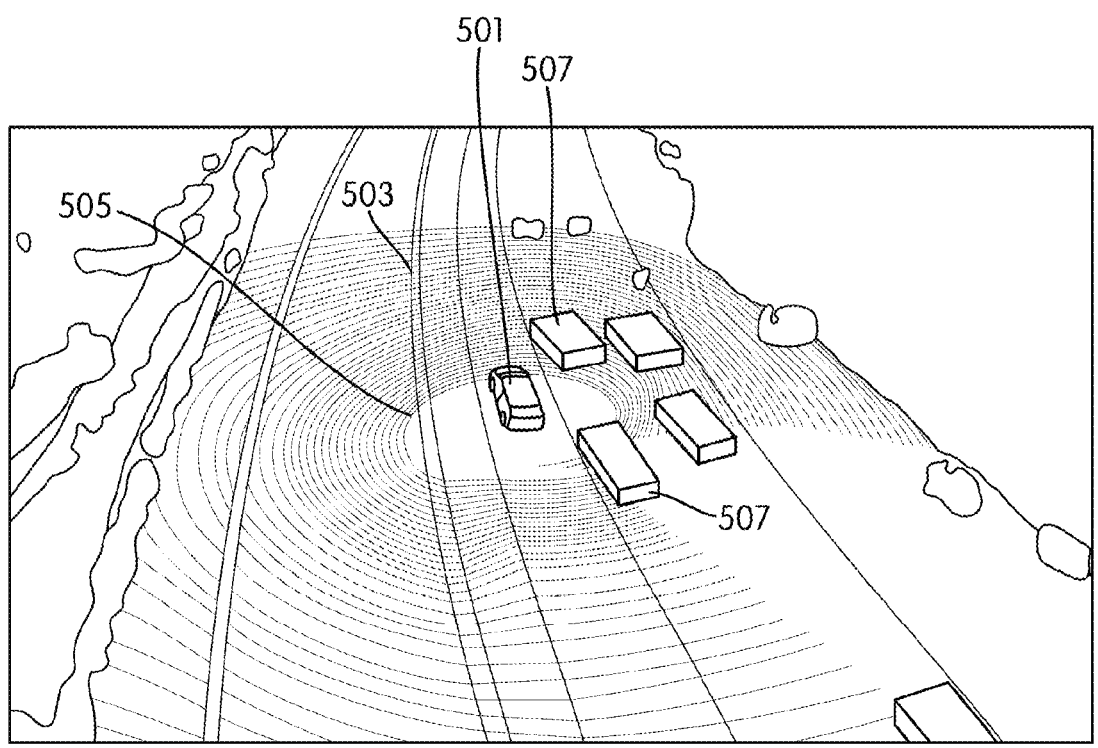
FIG. 5 is a user interface displayed by the autonomous vehicle control system of FIG. 1 according to a four level of detail including a dynamic three-dimensional view of detected vehicle and traffic data.

FIG. 5 illustrates yet another user interface that is even more detailed than the other examples discussed above. In the detailed view of FIG>5, the display illustrates the environment surrounding the vehicle 501 including, for example, the roadway, the path of travel 503, and nearby objects and other vehicles 507. Again the user interface also displays a circular icon 505 around the graphical representation of the vehicle. However, unlike the example of FIG. 4, the user interface of FIG. 5 displays the graphic images in a three-dimensional perspective rendering and may include actual image data from the exterior cameras 18 instead of graphical representations. With the user interface of FIG. 4, the driver is informed of what the sensors and cameras of the vehicle are detecting. The driver can be convinced that the vehicle has detected and acknowledges relevant objects in the surroundings of the vehicle.

Additionally, the detailed view of the user interface of FIG. 5 illustrates the state of the automated driving vehicle, for example, the function of various sensors, electronic control units, actuators (e.g., brakes, steering, and engine), and other vehicle hardware. The display also illustrates vehicle maneuvers that are currently planned by the vehicle and maneuvers that are currently being executed by the automatic vehicle system. For example, the detailed view of FIG. 5 can be configured to show lane changes, turning at intersections, driving straight, etc. as or before the maneuvers occur.

The adaptive user interface system is configured to modify the type and amount of information on the display to adapt to the driver's preferences. In some implementations, the controller, via the user interface, asks the driver how much information the driver desires. The user interface provides multiple questions to the driver seeking information that is grouped into categories such as low, medium, or high. In some implementations, the controller is configured to ask questions about specific displayed items. The questions may be presented on start-up of the vehicle or based on time/mileage intervals.

Figure 6:
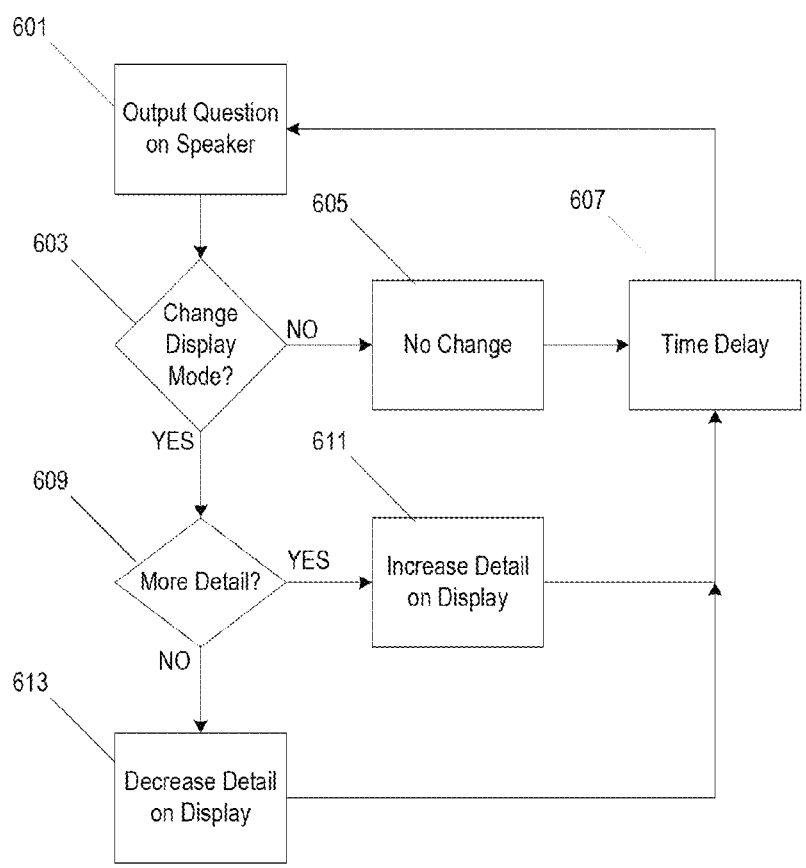
FIG. 6 is a flowchart of a method implemented by the autonomous vehicle control system of FIG. 1 for prompting the user/driver regarding their comfort level with the current level of display detail of the user interface.

FIG. 6 illustrates one method for adjusting the display setting of the user interface based on queries posed to the driver of the vehicle. The system starts by outputting a question in audio form through the speakers of the vehicle (step 601). The first question asks the driver if they would like to change the current display mode (step 603). The system monitors an input interface (e.g., a microphone, a button, or a touch-screen display) for a response from the driver. If the driver responds "no," then the system makes no change to the user interface shown on the display (step 605). The system then waits for a defined time period or mileage to elapse (step 607) before prompting the user again about their display preferences.

However, if the driver indicates that they would like to change the display mode (step 603), the system further queries whether the driver would like for the user interface to provide more detail or less detail (step 613). If the driver responds with "more," the system modifies the user interface to adapt to the request (step 611). If the driver responds with "less," the system modifies the user interface to adapt to that request accordingly (step 613).

In some implementations, the adaptive user interface system is configured to cycle through a series of preconfigured user interface configurations in response to driver feedback. For example, if the adaptive user interface system is currently showing the user interface of FIG. 4 and the driver indicates that they would like a less detailed user interface, the system would change the user interface to the configuration illustrated in FIG. 3. Conversely, if the driver indicates that they would like more detail, the system would adapt to display the user interface of FIG.5.

Over time, as the driver becomes familiar and comfortable with the automated systems, the controller automatically reduces the amount of information presented on the display. The system may also cause the display to indicate to the driver the information that is not currently being displayed, but is available if desired.

In other implementations, instead of or in addition to prompting the driver for conscious/active feedback (as illustrated in FIG. 6), the system is configured to monitor the autonomous reactions of the driver and to automatically modify the user interface accordingly. For example, the controller receives data from one or more "driver stress sensors" 16 that may monitor heart rate, skin conductance, or other physiological driver conditions. The data from these sensors is then processed to evaluate a stress level of the driver. The system then increases or decreases the amount of information on the display based on the detected stress level of the driver.

Figure 7:
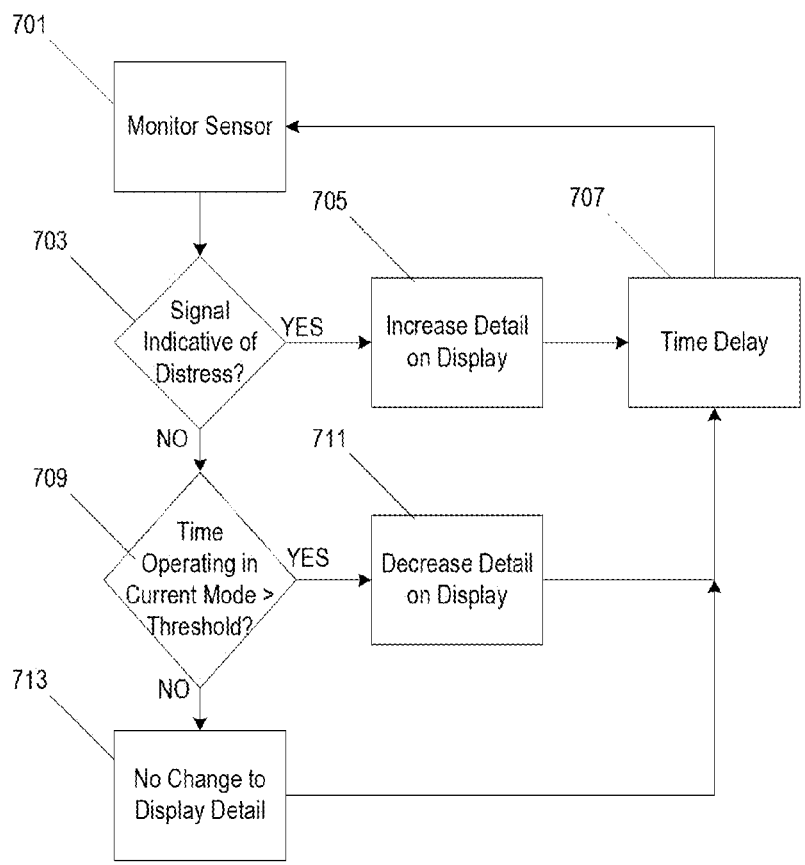
FIG. 7 is a flowchart of a method implemented by the autonomous vehicle control system of FIG. 1 for automatically detecting a user comfort level and for adjusting the level of detail of the user interface accordingly.

FIG. 7 illustrates one example of a method for monitoring stress-levels of the driver and for automatically adapting the user interface accordingly. The system monitors a sensor (step 701) for a signal indicative of a stress level of the driver (e.g., a heart rate). If the signal from the sensor is indicative of stress/distress (step 703), then the system automatically increases the level of detail provided on the display (step 705). The system then waits for a defined period of time or mileage (step 707) before evaluating the stress level again.

Conversely, if the sensors do not indicate a level of distress (step 703), the system checks to see if a defined period of time has elapsed since the display was last modified (step 709) and, if so, the level of detail in the user interface is automatically decreased (step 711). However, if the user interface was already recently modified (step 709), then the system continues to display that same level of detail in the user interface. In this way, the system not only responds automatically to the driver's comfort level, but ultimately seeks to reduce the level of detail provided in the user interface as the driver becomes more comfortable with the automatic operation of the vehicle system.

It is to be understood that the specific examples described above illustrative and that other implementations are possible without departing from the scope of the invention. For example, instead of showing the user interface on a screen mounted on the interior dashboard of the vehicle, the user interface may be output through an instrument cluster, a heads-up display, a center console, a mobile device (e.g., a smart phone or tablet), or a wearable device (e.g., a watch). Likewise, the specific user interfaces illustrated in FIGS. 2-5 are only a few examples—other implementations can include more, fewer, or different details depending, for example, on the type and operation of the automated vehicle system.

Thus, the invention provides, among other things, a drive state indicator for an autonomous vehicle. Various features and advantages of the invention are set forth in the following claims.

What is claimed is:

1. An adaptive user interface system for a vehicle with an automatic vehicle system, the adaptive user interface system including:
a display; and
an electronic controller, electrically coupled to the display, and configured to
generate a graphical user interface indicative of operation of the automatic vehicle system,
output the graphical user interface on the display,
monitor an indicia of a driver's comfort level,
determine, based on the monitored indicia, when the driver is not comfortable with the operation of the automatic vehicle system, and
modify the graphical user interface to provide an increased level of detail in response to determining that the driver is not comfortable with the operation of the automatic vehicle system.

2. The adaptive user interface system of claim 1, further comprising a sensor configured to detect a physiological condition of the driver, and wherein the controller is configured to monitor the indicia of the driver's comfort level by monitoring an output of the sensor.

3. The adaptive user interface system of claim 2, wherein the sensor includes a heart rate sensor, and wherein the controller is configured to determine when the driver is not comfortable with the operation of the automatic vehicle system by detecting an increase in heart rate.

4. The adaptive user interface system of claim 1, wherein the electronic controller is configured to generate the graphical user interface by selecting a first user interface of a plurality of predefined user interfaces, and wherein the electronic controller is configured to modify the graphical user interface by selecting a second user interface of a plurality of predefined user interfaces and outputting the second user interface on the display, the second user interface providing a greater level of detail than the first user interface.

5. The adaptive user interface system of claim 4, wherein the second user interface provides detail of the operation of the automatic vehicle system that is not provided by the first user interface.

6. The adaptive user interface system of claim 4, wherein the second user interface provides detail of a detected nearby vehicle that is not provided by the first user interface.

7. The adaptive user interface system of claim 4, wherein the second user interface provides a dynamic graphical representation of a vehicle, and wherein the first user interface does not provide the same dynamic graphical representation of the vehicle as the second user interface.

8. A method for providing an adaptive user interface for a vehicle with an automatic vehicle system, the method comprising:
generating a graphical user interface indicative of operation of the automatic vehicle system,
outputting the graphical user interface on a display,
monitoring an indicia of a driver's comfort level,
determining, based on the monitored indicia, when the driver is not comfortable with the operation of the automatic vehicle system, and
modifying the graphical user interface to provide an increased level of detail in response to determining that the driver is not comfortable with the operation of the automatic vehicle system.

9. The method of claim 8, further comprising receiving from a sensor a signal indicative of a physiological condition of the driver, and wherein monitoring the indicia of the driver's comfort level including monitoring an output of the sensor.

10. The method of claim 9, wherein receiving the signal indicative of the physiological condition includes receiving an indication of a heart rate from a heart rate sensor, and wherein determining when the driver is not comfortable with the operation of the automatic vehicle system includes detecting an increase in heart rate.

11. The method of claim 8, wherein generating the graphical user interface includes selecting a first user interface of a plurality of predefined user interfaces, and wherein modifying the graphical user interface includes selecting a second user interface of a plurality of predefined user interfaces and outputting the second user interface on the display, the second user interface providing a greater level of detail than the first user interface.

12. The method of claim 11, wherein the second user interface provides detail of the operation of the automatic vehicle system that is not provided by the first user interface.

13. The method of claim 11, wherein the second user interface provides detail of a detected nearby vehicle that is not provided by the first user interface.

14. The method of claim 11, wherein the second user interface provides a dynamic graphical representation of a vehicle, and wherein the first user interface does not provide the same dynamic graphical representation of the vehicle as the second user interface.

* * * * *